United States Patent
Orlando et al.

(10) Patent No.: US 11,544,201 B2
(45) Date of Patent: Jan. 3, 2023

(54) MEMORY TRACING IN AN EMULATED COMPUTING SYSTEM

(71) Applicant: Micron Technology, Inc., Boise, ID (US)

(72) Inventors: Alessandro Orlando, Milan (IT); Danilo Caraccio, Milan (IT); Angelo Alberto Rovelli, Agrate Brianza (IT)

(73) Assignee: Micron Technology, Inc., Boise, ID (US)

( * ) Notice: Subject to any disclaimer, the term of this patent is extended or adjusted under 35 U.S.C. 154(b) by 86 days.

(21) Appl. No.: 17/169,042

(22) Filed: Feb. 5, 2021

(65) Prior Publication Data

US 2022/0253387 A1    Aug. 11, 2022

(51) Int. Cl.
*G06F 12/1027* (2016.01)
*G06F 3/06* (2006.01)
*G06F 9/30* (2018.01)
*G06F 9/455* (2018.01)

(52) U.S. Cl.
CPC ........ *G06F 12/1027* (2013.01); *G06F 3/0604* (2013.01); *G06F 3/0659* (2013.01); *G06F 3/0664* (2013.01); *G06F 9/30043* (2013.01); *G06F 9/45558* (2013.01); *G06F 2009/45583* (2013.01); *G06F 2212/657* (2013.01); *G06F 2212/68* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,560,036 A | * | 9/1996 | Yoshida | G06F 11/3636 711/170 |
| 2016/0011893 A1 | * | 1/2016 | Strong | G06F 11/3636 718/1 |
| 2016/0047859 A1 | | 2/2016 | Deutsch et al. | |
| 2022/0253387 A1 | * | 8/2022 | Orlando | G06F 3/0604 |

OTHER PUBLICATIONS

Payer, et al., "Lightweight Memory Tracing", ETH Zurich, retrieved from: https://nebelwelt.net/files/13ATC.pdf on Feb. 5, 2021, 12 pages.
Schmidt, "Evaluating Techniques for Full System Memory Tracing", www.kit.edu, Oct. 18, 2017, 50 pages.

* cited by examiner

*Primary Examiner* — Sean D Rossiter
(74) *Attorney, Agent, or Firm* — Brooks, Cameron & Huebsch, PLLC

(57) ABSTRACT

Systems, apparatuses, and methods related to memory tracing in an emulated computing system are described. Static tracepoints can be inserted into a particular function as part of operating the emulated computing system. By executing the function including the static tracepoints as part of a memory access request, the emulated computing system can receive information corresponding to both a virtual address and a physical address in a real computing system in which data corresponding to the memory access request is stored.

12 Claims, 4 Drawing Sheets

MEMORY TRACING IN AN EMULATED COMPUTING SYSTEM

TECHNICAL FIELD

The present disclosure relates generally to semiconductor memory and methods, and more particularly, to apparatuses, systems, and methods for memory tracing in an emulated computing system.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1A:
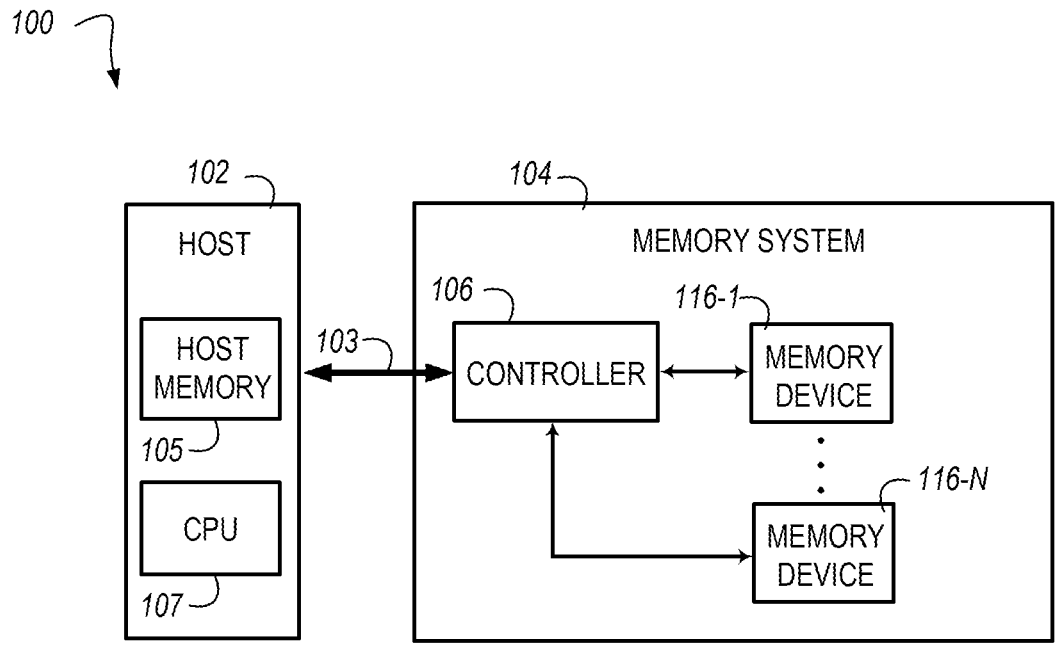
FIG. 1A is a functional block diagram in the form of a computing system including an apparatus including a memory system in accordance with a number of embodiments of the present disclosure.

Systems, apparatuses, and methods related to memory tracing in an emulated computing system are described. Static tracepoints can be inserted into a particular function as part of operating the emulated computing system. By executing the function including the static tracepoints as part of a memory access request, the emulated computing system can receive information corresponding to both a virtual address and a physical address in a real computing system in which data corresponding to the memory access request is stored.

The main memory (or "system memory") of a computing system is a fast, critical, shared memory resource that stores operating system software, software applications, and other information for a central processing unit (CPU) of a computing system to have fast and direct access when needed to perform tasks and/or operations. Main memory is generally provided in a computing system as a random-access memory (RAM) device that is volatile in nature. The main memory of a computing system generally includes a contiguous range of addresses (e.g., physical address spaces) that can be accessed by, for example, the CPU independently. However, the CPU generally views the contiguous range of addresses associated with the main memory as an abstracted range of virtual addresses that correspond to particular physical address ranges in the main memory.

In order to analyze the behavior of memory accesses in a computing system (e.g., memory accesses involving the main memory of the computing system), memory tracing techniques may be employed within the computing system. Memory tracing generally includes execution of particular instructions in addition to instructions that are executed in performance of a memory access operation and can be used to enhance understanding of the behavior of the computing system. For example, memory tracing techniques can be used in debugging, taint checking, dataflow tracking, workload analysis, analysis of software performance, and/or analysis of computing system security, among others. In addition, information gleaned from memory tracing can be used as an input for microarchitecture simulation and/or emulation, which can provide insights into possible new computing architectures.

Memory tracing can be facilitated by the insertion of tracepoints into functions, commands, and/or instructions executed by a memory system. As used herein, the term "tracepoint" generally refers to a location in which data is stored in a computing application or memory system that can be evaluated during runtime of a computing system. When a tracepoint is reached during execution of a function, command, and/or instruction, values corresponding to an arbitrary set of data can be targeted and collected when the tracepoint is reached. In general, a "static tracepoint" refers to a tracepoint that is inserted into a function or command at a particular point in time during operation of a computing system.

However, memory tracing is a time consuming and computing resource intensive process. Some approaches to memory tracing include dynamic binary instrumentation (DBI) of code, system simulation, and/or hardware profiling tools, each of which suffer from shortcomings. Approaches that include DBI may merely provide memory tracing data corresponding to a particular application (e.g., DBI based approaches may not offer full system access and/or emulation and therefore may not provide full system memory tracing) and/or may only be able to return virtual addresses associated with memory accesses to an emulated computing system. Approaches that include system simulation may not support certain operating system distributions and therefore may not be able to provide full system memory tracing. Hardware profiling tools may require physical access to memory pins as well as expensive resources such as interposers and/or protocol analyzers to adequately perform memory tracing operations.

In order to address these and other shortcoming present in some approaches, embodiments described herein can allow for full system memory tracing in which both virtual and physical addresses (as well as other information) associated with a memory access can be determined and provided to an emulated computing system. Further, embodiments described herein can allow for full system memory tracing for any operating system distribution executed by the emulated computing system.

In some embodiments, a full computing system can be emulated (e.g., from the application layer down to the hardware) using an emulated computing system such as a quick emulator and virtualizer that can provide hardware virtualization (e.g., QEMU). The emulated computing system can be a hosted virtual machine monitor that can emulate a processor of a real computing system through dynamic binary translation and can provide a set of different hardware and device models for the emulated computing system, thereby enabling the emulated computing system to run a variety of guest operating systems. The emulated computing system can also be used with Kernel-based Virtual Machine (KVM) to run virtual machines at near-native speed (by taking advantage of hardware extensions such as Intel VT-x). The emulated computing system can also perform emulation for user-level processes, allowing applications compiled for one architecture to run on another.

The emulated computing system can be referred to herein as a "guest system" or variants thereof, while the computing system that is preforming emulation can be referred to as a "physical system" and/or "real system," or variants thereof. Specialized instructions can be generated by the guest system and transferred to the physical system as part of a memory access operation. The specialized instructions can correspond to trace points (e.g., static trace points) that can be used to retrieve virtual and physical addresses of the physical system in addition to the data involved in the memory access.

By providing full system emulation with the ability to execute specialized instructions to retrieve both virtual and physical addresses associated with a memory access, memory tracing can be improved in comparison to the approaches described above. This can, in turn, improve the performance of a computing system by allowing for improved debugging, taint checking, dataflow tracking, workload analysis, analysis of software performance, and/or analysis of computing system security, among others.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 107 may reference element "07" in FIG. 1, and a similar element may be referenced as 207 in FIG. 2. A group or plurality of similar elements or components may generally be referred to herein with a single element number. For example, a plurality of reference elements 116-1 to 116-N may be referred to generally as 116. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1A is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1A, the memory devices 116-1 to 116-N can include one or more memory modules (e.g., single in-line memory modules, dual in-line memory modules, etc.). The memory devices 116-1 to 116-N can include volatile memory and/or non-volatile memory. In a number of embodiments, the memory devices 116-1 to 116-N can include a multi-chip device. A multi-chip device can include a number of different memory types and/or memory modules. For example, a memory system can include non-volatile or volatile memory on any type of a module.

In some embodiments, the memory system 104 can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

The memory devices 116-1 to 116-N can provide main memory for the computing system 100 or could be used as additional memory or storage throughout the computing system 100. The memory devices 116-1 to 116-N can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

In embodiments in which the memory devices 116-1 to 116-N include persistent or non-volatile memory, the memory devices 116-1 to 116-N can be flash memory devices such as NAND or NOR flash memory devices. Embodiments are not so limited, however, and the memory devices 116-1 to 116-N can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, 3-D Crosspoint (3D XP) memory device, etc., or combinations thereof.

As an example, a ferroelectric RAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

As shown in FIG. 1A, the memory system 104 includes a controller 106. In some embodiments, the controller 106 can be a media controller such as a non-volatile memory express (NVMe) controller. For example, the controller 106 can be configured to perform operations such as copy, write, read, error correct, etc. for the memory devices 116-1 to 116-N. In addition, the controller 106 can include special purpose circuitry and/or instructions to perform various operations described herein. That is, in some embodiments, the controller 106 can include circuitry and/or instructions that can be executed to control movement of data and/or addresses associated with data between the memory devices 116-1 to 116-N and the host 102.

As illustrated in FIG. 1A, a host 102 can be coupled to the memory system 104 via an interface 103. The interface 103 can be any type of communication path, bus, or the like that allows for information to be transferred between the host 102 and the memory system 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 103 is a PCIe 5.0 interface that is compliant with the compute express link (CXL) protocol standard. Accordingly, in some embodiments, the interface 103 can support transfer speeds of at least 32 gigatransfers per second.

In some embodiments, the interface 103 can be configured such that signaling can be selectively transferred via the interface 103 according to multiple protocols. For example, signaling can be selectively transferred via the interface 103 according a cache protocol in which data is transferred between a host and the memory system 104 and a memory protocol in which data is transferred between a host and the memory devices 116-1 to 116-N. In some embodiments, the cache protocol can be invoked to efficiently cache data associated with the host memory 105 according to a request and response approach. In contrast, the memory protocol can be invoked to provide access to the memory devices 116-1 to 116-N by the host using read/write command with the host processor (e.g., the CPU 107) acting as a master device and the memory devices 116-1 to 116-N acting as a subordinate device.

Figure 1B:
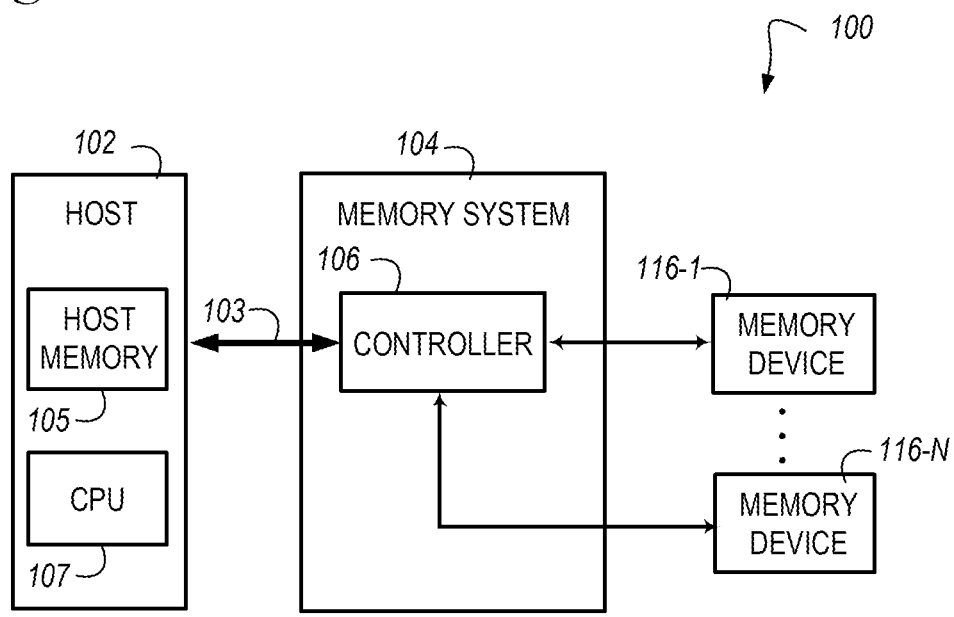
FIG. 1B is another functional block diagram in the form of a computing system including an apparatus including a memory system in accordance with a number of embodiments of the present disclosure.

In a number of embodiments, the memory devices 116-1 to 116-N can be resident on the memory system 104, however, as illustrated in FIG. 1B, embodiments are not so limited and in some embodiments, the memory devices 116-1 to 116-N can be external to the memory system 104. As used herein, the term "resident on" refers to something that is physically located on a particular component. For example, the memory devices 116-1 to 116-N being "resident on" the memory system 104 refers to a condition in which the memory devices 116-1 to 116-N are physically within the memory system 104. The term "resident on" may be used interchangeably with other terms such as "deployed on" or "located on," herein.

The host 102 can include host memory 105 and a central processing unit (CPU) 107. The host 102 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). The system 100 can include separate integrated circuits or the host 102, the memory system 104 the controller 106, and/or the memory devices 116-1 to 116-N can be on the same integrated circuit. The system 100 can be, for instance, a server system and/or a high-performance computing (HPC) system and/or a portion thereof. Although the example shown in FIG. 1A illustrate a system having a Von Neumann architecture, embodiments of the present disclosure can be implemented in non-Von Neumann architectures, which may not include one or more components (e.g., CPU, ALU, etc.) often associated with a Von Neumann architecture.

The embodiment of FIG. 1A can include additional circuitry that is not illustrated so as not to obscure embodiments of the present disclosure. For example, the storage controller 104 can include address circuitry to latch address signals provided over I/O connections through I/O circuitry.

Address signals can be received and decoded by a row decoder and a column decoder to access the memory devices 116-1 to 116-N. It will be appreciated by those skilled in the art that the number of address input connections can depend on the density and architecture of the memory devices 116-1 to 116-N.

FIG. 1B is another functional block diagram in the form of a computing system 100 including an apparatus including a memory system 104 in accordance with a number of embodiments of the present disclosure. In contrast to the embodiment shown in FIG. 1A, in the embodiment illustrated in FIG. 1B, the memory devices 116-1 to 116-N are external to the memory system 104.

Figure 2:
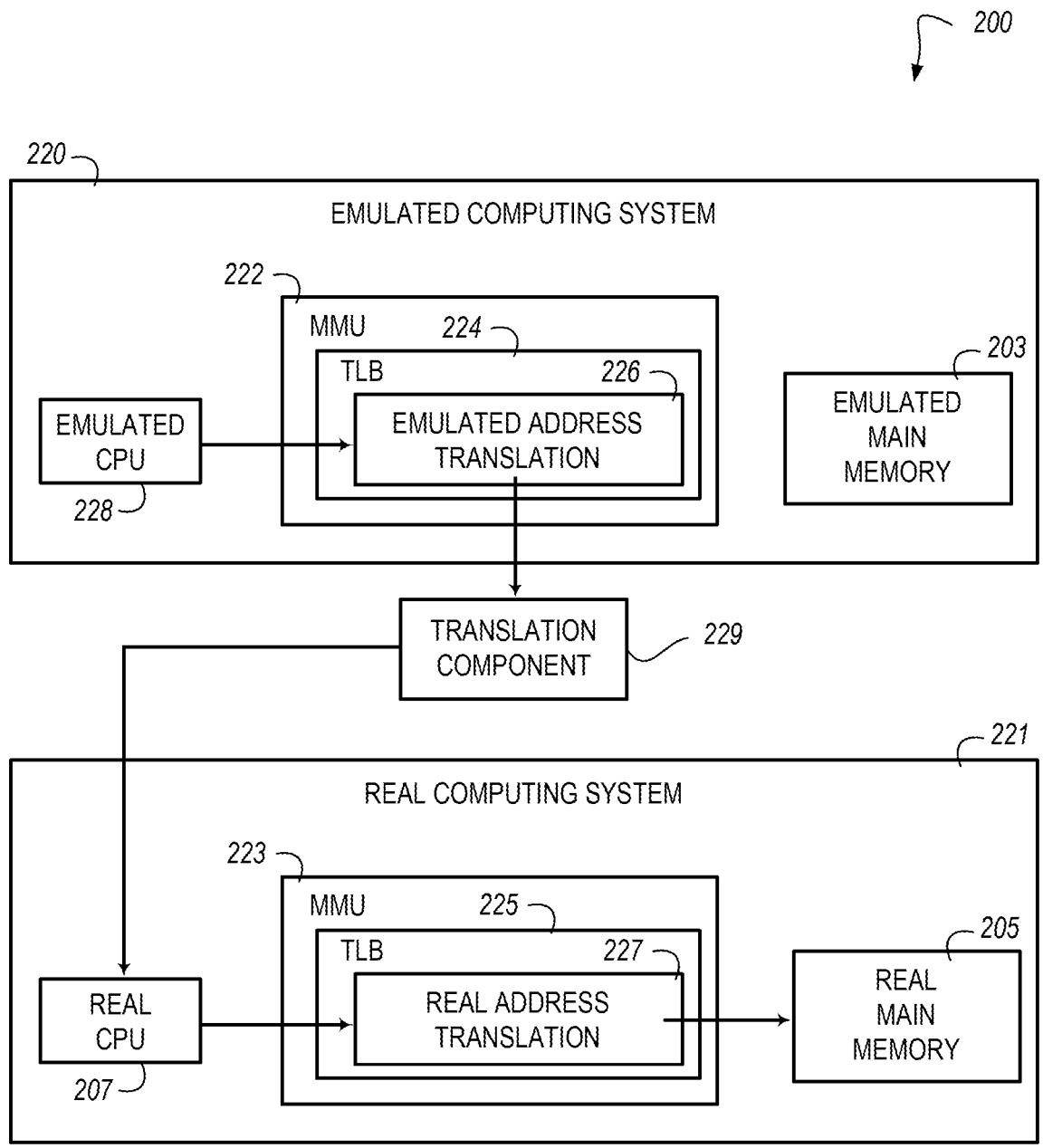
FIG. 2 is a functional block diagram in the form of a computing system including an apparatus, which includes an emulated computing system and a real computing system in accordance with a number of embodiments of the present disclosure.

FIG. 2 is a functional block diagram in the form of a computing system 200 including an apparatus, which includes an emulated computing system 220 and a real computing system 221 in accordance with a number of embodiments of the present disclosure. As shown in FIG. 2, the computing system 200 includes an emulated computing system 220 and real computing system 221. The emulated computing system 220 and the real computing system 221 can be in communication via an translation component 229.

As used herein, an "emulated computing system" or "guest computing system" generally refers to a computing system that provides virtual hosting of one or more virtual computers on a single computing system. An emulated computing system can virtualize one or more full computing systems, including peripheral devices associated with the virtualized computing system(s). In some embodiments, an emulated computing system can support multiple computing architectures as well as multiple instruction sets. An emulated computing system can provide full emulation of a real computing system from the application layer to the hardware level. In some embodiments, an emulated computing system can be provisioned with processing (e.g., computational) resources and memory resources and can be provisioned with its own virtual address space.

As used herein, a "real computing system" generally refers to a "host" computing system that includes physical processing (e.g., computational) resources and memory resources. An emulated computing system can, in some embodiments, be provisioned with these physical resources. The real computing system can execute a host operating system (e.g., Linux, Windows, etc.) on which applications associated with the emulated computing system can run.

The translation component 229 can include hardware and/or executable instructions that can translate signals and/or commands between the emulated computing system 220 and the real computing system 221. In some embodiments, the translation component 229 can include a code generator (e.g., a QEMU tiny code generator) that can incorporate a computing code compiler into other tasks performed by the emulated computing system 220 at runtime.

In some embodiments, the translation component 229 can execute load/store instructions (e.g., load/store instructions associated with the emulated computing system and/or load/store instructions associated with the real computing system). As used herein, the term "load/store instruction(s)" generally refers to instructions, commands, and/or signaling that is indicative of performance of an operation to read ("load") data and/or write ("store") data.

In addition, the acceleration circuitry 229 can perform translation operations to, for example, translate semantics used by the emulated computing system 220 into semantics used by the real computing system 221. As used herein, "semantics" generally refer to the format of an instruction, command, or signal in reference to the meaning of the instruction, command, or signal. For example, instructions that can be understood by the emulated computing system 220 to perform an arbitrary operation, "O" may not be understood by the real computing system 221, and vice versa. By translating the semantics associated with the emulated computing system 220 into semantics that can be understood by the real computing system 221, the real computing system can understand that the instructions correspond to performance of the arbitrary operation "O."

As shown in FIG. 2, the emulated computing system 220 can include an emulated processor (e.g., the emulated CPU 228) and an emulated main memory 203. The emulated computing system 220 can further include a memory management unit (MMU) 222, a translation lookaside buffer (TLB) 224, and/or an emulated address translation block 226. In some embodiments, the MMU 222 can be a Soft-MMU that can associate virtual addresses of the emulated computing system 220 to physical addresses in the TLB 223 and/or the emulated main memory 203.

Further, as shown in FIG. 2, the real computing system 221 can include a real processor (e.g., the real CPU 207) and a real main memory 205. The real computing system 221 can further include a memory management unit (MMU) 223, a translation lookaside buffer (TLB) 225, and/or a real address translation block 227. In some embodiments, the MMU 222 can associate virtual addresses of the real computing system 221 to physical addresses in the TLB 225 and/or the real main memory 205.

In some embodiments, the computing system 200 can be operated in the following manner. First, the emulated CPU 228 can execute a load/store instruction indicative of a memory access request involving the real computing system 221. The load/store instruction can include a virtual address of the emulated computing system 220. Second, the emulated computing system 220 can perform an operation to search the TLB 224 (e.g., using the emulated address translation block 226) to locate a physical address associated with the virtual address of the emulated computing system 220. If the virtual address is not found in the TLB 224 (e.g., if a "miss" occurs when locating the virtual address in the TLB 224), an operation to locate and/or retrieve the physical address associated with the virtual address of the emulated computing system 220 can be performed. If, as described in more detail below in connection with FIG. 3, the virtual address is not found in the TLB 224, one or more tracepoints can be inserted into a function (e.g., the load/store function).

The load/store function (including the tracepoint(s)) can be transferred to the acceleration circuitry 229 and can be translated into a set of semantics that can be understood by the real computing system 221. The translated load/store instruction can then be transferred to the real computing system 221. The real computing system 221 (e.g., the real CPU 207 of the real computing system 221) can execute the instruction to retrieve a virtual address associated with the real computing system 221 that corresponds to data involved in the memory access request. Next, the real computing system 221 can perform an operation to search the TLB 225 (e.g., using the real address translation block 227) to locate a physical address associated with the virtual address of the real computing system 220. If the virtual address is not found in the TLB 225 (e.g., if a "miss" occurs when locating the virtual address in the TLB 225), an operation to locate and/or retrieve the physical address associated with the virtual address of the real computing system 221 can be performed.

Once the physical address corresponding to the data involved in the memory access request is located, the data can be retrieved (e.g., from the real main memory 205) and returned to the emulated computing system 220. As described in more detail, herein, due to the insertion of the tracepoints discussed above, both the virtual address in the real computing system 221 and the physical address in real computing system 221 corresponding to the data can be returned to the emulated computing system 220.

In a non-limiting example, an apparatus (e.g., the computing system 200) can include a first quantity of processing units (e.g., the emulated CPU 228), which may be referred to for simplicity as a "first processing unit." The first processing unit can execute a virtualized operating system environment (e.g., the emulated computing system 220). In at least one embodiment, the virtualized operating system environment can be a quick emulation (QEMU) computing environment. A first memory resource (e.g., the emulated main memory 203) can be coupled to the first memory resource. Continuing with this example, the first processing unit can determine whether a virtual address of the virtualized operating system environment is associated to a physical address of the first memory resource.

The first memory resource can, responsive to a determination the virtual address of the virtualized operating system environment is associated to a physical address of the first memory resource (e.g., an address in the emulated main memory 203), generate a memory access request comprising an instruction including the physical address and one or more static trace points. In some embodiments, the instruction can include virtual address information and/or physical address information associated with the first processing unit and the first memory resource. The first processing unit can then execute the instruction to cause a second quantity of processing units (e.g., the real CPU 207), which may be referred to for simplicity as a "second processing unit," that is coupled to a second memory resource (e.g., the real main memory 205) to execute a memory access corresponding to the memory access request.

In some embodiments, the first processing unit and the second processing unit are communicatively coupled to one another via a quick emulation application programming interface and instructions and/or commands can be transferred between the first processing unit and the second processing unit via the quick emulation API and/or via an application translation layer associated with the computing system 200.

Subsequent to execution of the memory access, the first processing unit can receive data corresponding to the memory access, virtual address information corresponding to a storage location in the second memory resource in which the data is written, and physical address information corresponding to the storage location in the second memory resource in which the data is written. Embodiments are not so limited, however, and in some embodiments, the first processing unit can receive information corresponding to a type of operation to access the data (e.g., a load/store operation, etc.), an access size of the data, a timestamp corresponding to access of the data, information corresponding to the translation lookaside buffer 224 having an address contained therein (e.g., a "TLB hit"), information corresponding to the translation lookaside buffer 224 having an inaccurate address contained therein (e.g., a "TLB miss"), etc.

The first processing unit can, responsive to a determination the virtual address of the virtualized operating system environment is not associated to a physical address of the first memory resource and perform an operation to locate a physical address within the first memory resource invoked by the memory access request. The first processing unit can then update the physical address in a translation lookaside buffer 224 coupled to the first memory resource.

In another non-limiting example, a system (e.g., the computing system 200) can include an emulated processing unit 228 associated with an emulated guest computing system 220. The system can further include a physical processing unit (e.g., the real CPU 207) associated with a physical host computing system (e.g., the real computing system 223) that is communicatively coupled to the emulated processing unit 228. The emulated processing unit 228 can generate an instruction indicative of a memory access operation that includes addressing information corresponding to the emulated guest computing system 220 and a plurality of static trace points.

The emulated processing unit 228 can perform an address translation operation within the emulated guest computing system to determine a guest physical address location associated with the memory access operation and transfer the instruction and information associated with the guest physical address location to the physical processing unit. In some embodiments, the emulated processing unit 228 can transfer the instruction and information associated with the guest physical address location to the physical processing unit via an application programming interface.

The physical processing unit can perform, responsive to receipt of the instruction, the memory access operation to retrieve data from a memory resource (e.g., the main memory 205) of the physical host computing system and transfer the data to the emulated guest computing system. In some embodiments, the emulated processing unit 220 can determine a physical address and a virtual address associated with the physical host computing system corresponding to the data retrieved in performance of the memory access operation.

Continuing with this example, the emulated processing unit 228 can perform a look-up operation in a translation lookaside buffer 224 of the emulated guest computing system 220 to determine a guest virtual address associated with the memory access operation prior to performance of the address translation operation within the emulated guest computing system 220. In some embodiments, the emulated processing unit 228 can perform a translation operation to translate a load/store command associated with the instruction prior to transfer of the instruction and information associated with the guest physical address location to the physical processing unit.

In some embodiments, the physical processing unit can perform an address translation operation within the physical host computing system to determine a physical host computing system virtual address location associated with the memory access operation. In some embodiments, the physical processing unit can perform an address translation operation within the physical host computing system to determine a physical host computing system physical address location associated with the memory access operation.

Figure 3:
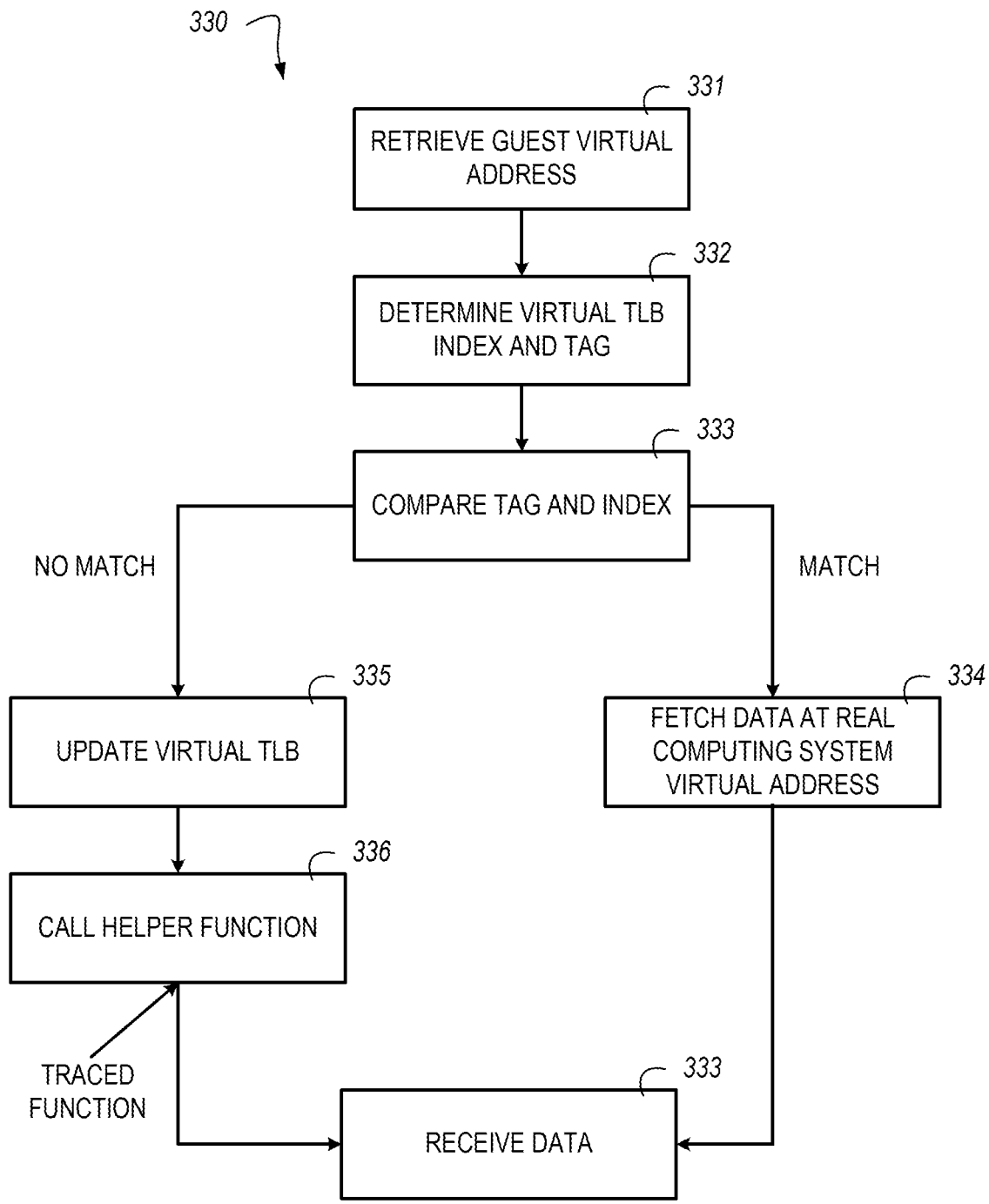
FIG. 3 is a flow diagram illustrating a translate mechanism for insertion of a static tracepoint associated with memory tracing in an emulated computing system in accordance with a number of embodiments of the present disclosure.

FIG. 3 is a flow diagram 330 illustrating a translate mechanism for insertion of a static tracepoint associated with memory tracing in an emulated computing environment in accordance with a number of embodiments of the present disclosure. At operation 331, a guest virtual address can be retrieved. In come embodiments, the guest virtual address is retrieved in response to an instruction generated by a guest CPU (e.g., the emulated CPU illustrated in FIG. 2, herein). The guest virtual address can be stored in a translation lookaside buffer (e.g., the TLB 224 illustrated in FIG. 2, herein) associated with a guest computing system (e.g., the emulated computing system 220 illustrated in FIG. 2, herein).

At operation 332, a virtual TLB index and tag corresponding to the guest virtual address can be determined. The virtual TLB index can correspond to a location in the TLB in which the guest virtual address is expected to be stored, while the tag can associate each entry in the TLB with an address space associated with the guest computing system.

At operation 333, the tag and virtual TLB index can be compared to determine if a match between the tag and the virtual TLB index has occurred. That is, in some embodiments, a determination can be made as to whether the guest virtual address is located in a space within the virtual TLB index that corresponds to the tag. If a match between the tag and the virtual TLB index occurs, at operation 334, data corresponding to a virtual address associated with a real computing system (e.g. the real computing system 221 illustrated in FIG. 2, herein) can be fetched.

In response to fetching the virtual address at the real computing system, the real computing system (e.g., the real CPU 207 illustrated in FIG. 2, herein) can cause performance of an address translation operation to determine a physical address (e.g., a physical address in the real main memory 205 illustrated in FIG. 2, herein) in which the requested data is stored. The data can then be retrieved from the memory of the real computing system and transferred to the guest computing system. In some embodiments, the data can be transferred to the guest computing system via an application programming interface.

If it is determined that the tag and virtual TLB index do not match, at operation 335, the virtual TLB can be updated such that the tag corresponds to the correct virtual address in the TLB, or vice versa. Once the virtual TLB index and/or the tag have been updated to reflect the correct location for the guest virtual address in the TLB, at operation 336, the guest computing system can execute an instruction to call a helper function. As used herein, the term "helper function" generally refers to a function that is called in the middle of executing translated target code phase. A helper function can be blended during translation from target code to TCG code. Further, helper functions can aid in target code translation. In addition, helper functions can provide an access to high-level functionalities and libraries in a running host (e.g., the guest computing system and/or the real computing system).

In some embodiments, one or more tracepoints (e.g., static tracepoints) can be inserted into the helper function to provide memory tracing, as described herein. For example, one or more tracepoints can be inserted into the helper function prior to receipt of the requested data at operation 333. Accordingly, a virtual address and a physical address associated with a memory access request can be determined and returned to the guest computing system along with the requested data.

Figure 4:
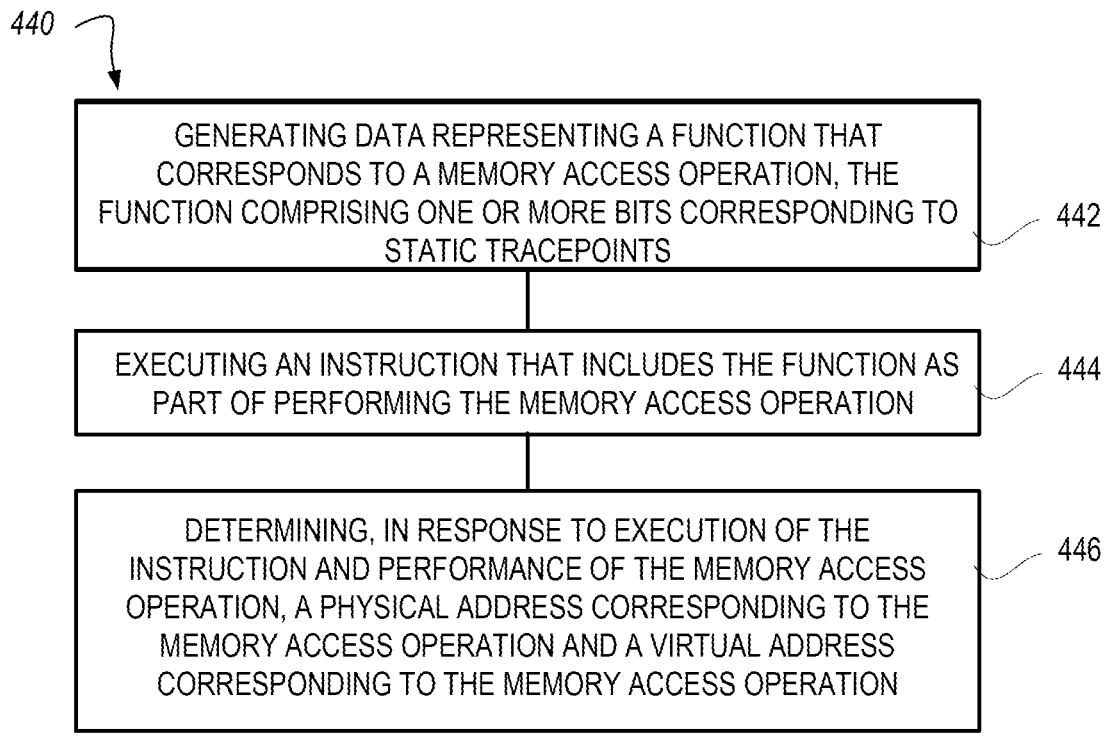
FIG. 4 is a flow diagram representing an example method for memory tracing in an emulated computing system in accordance with a number of embodiments of the present disclosure.

FIG. 4 is a flow diagram representing an example method 440 for memory tracing in an emulated computing environment in accordance with a number of embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the controller 106 illustrated in FIG. 1. Embodiments are not limited, however, and in some embodiments, the method 440 is performed by the computing system 200 illustrated in FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 442, the method 440 can include generating data representing a function that corresponds to a memory access operation, the function comprising one or more bits corresponding to static tracepoints. In some embodiments, the function can include comprises a quick emulator load/store command.

At block 444, the method 440 can include executing an instruction that includes the function as part of performing the memory access operation. In some embodiments, the method 440 can include executing the instruction by an emulated computing system (e.g. the emulated computing system 220 illustrated in FIG. 2, herein) to cause a physical computing system to perform the memory access operation.

At block 446, the method 440 can include determining, in response to execution of the instruction and performance of the memory access operation, a physical address corresponding to the memory access operation and a virtual address corresponding to the memory access operation. In some embodiments, the method 440 can include determining the physical address corresponding to the memory access operation based, at least in part, on information stored in a translation lookaside buffer associated with an emulated computing system.

In some embodiments, the method 440 can include receiving the executed instruction by an translation component (e.g., the translation component 229 illustrated in FIG. 2, herein) coupled to an emulated computing system that executes the instruction and a physical computing system (e.g. the real computing system 221 illustrated in FIG. 2, herein). The method 440 can further include performing, using the translation component, an operation to translate a load/store command associated with the emulated computing system to a load/store command associated with the physical computing system and/or transferring the executed instruction and the load/store command associated with the physical computing system to the physical computing system.

Figure 5:
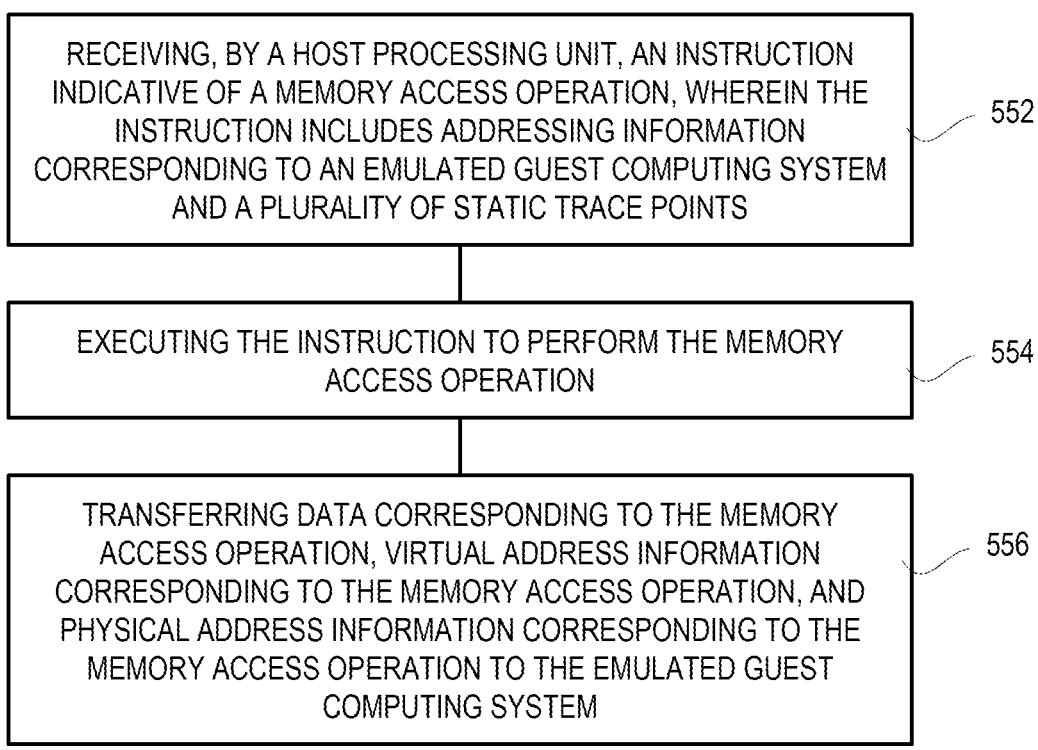
FIG. 5 is a flow diagram representing another example method for memory tracing in an emulated computing system in accordance with a number of embodiments of the present disclosure.

FIG. 5 is a flow diagram representing another example method 550 for memory tracing in an emulated computing environment in accordance with a number of embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the controller 106 illustrated in FIG. 1. Embodiments are not limited, however, and in some embodiments, the method 440 is performed by the computing system 200 illustrated in FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 552, the method 550 can include receiving, by a host processing unit, an instruction indicative of a memory access operation, wherein the instruction includes addressing information corresponding to an emulated guest computing system (e.g., the emulated computing system 220 illustrated in FIG. 2, herein) and a plurality of static trace points.

At block 554, the method 550 can include executing the instruction to perform the memory access operation. In some embodiments, the method 540 can include receiving the instruction and transferring the data via an application programming interface, as described above.

At block 556, the method 550 can include transferring data corresponding to the memory access operation, virtual address information corresponding to the memory access operation, and physical address information corresponding to the memory access operation to the emulated guest computing system. In some embodiments, the virtual address information corresponding to the memory access operation and/or the physical address information corresponding to the memory access operation can be determined based, at least in part, on information corresponding to at least one static trace point among the plurality of static trace points. In some embodiments, the virtual address information corresponding to the memory access operation and/or the physical address information corresponding to the memory access operation can correspond to address locations in a memory resource (e.g., the real main memory 205 illustrated in FIG. 2, herein) resident on a computing system on which the host processing unit (e.g., the CPU 207 illustrated in FIG. 2, herein) is deployed.

The method 540 can further include translating, using an translation component (e.g., the translation component 229 illustrated in FIG. 2, herein) coupled to the host processing unit and the emulated guest computing system, a virtual load/store instruction to a host load/store instruction prior to receiving the instruction indicative of the memory access operation.

In some embodiments, the method 540 can include determining a physical address of data involved in the memory access operation, the physical address associated with the emulated guest computing system and corresponding to the memory access operation based, at least in part, on information stored in a translation lookaside buffer associated with the emulated guest computing system.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
generating data representing a function that corresponds to a memory access operation, the function comprising one or more bits corresponding to static tracepoints;
executing an instruction that includes the function as part of performing the memory access operation; and
determining, in response to execution of the instruction and performance of the memory access operation, a physical address corresponding to the memory access operation and a virtual address corresponding to the memory access operation.

2. The method of claim 1, further comprising determining the physical address corresponding to the memory access operation based, at least in part, on information stored in a translation lookaside buffer associated with an emulated computing system.

3. The method of claim 1, further comprising executing the instruction by an emulated computing system to cause a physical computing system to perform the memory access operation.

4. The method of claim 1, wherein the function comprises an emulator load/store command.

5. The method of claim 1, further comprising:
receiving the executed instruction by a translation component coupled to an emulated computing system that executes the instruction and a physical computing system;
performing, using the translation component, an operation to translate a load/store command associated with the emulated computing system to a load/store command associated with the physical computing system; and
transferring the executed instruction and the load/store command associated with the physical computing system to the physical computing system.

6. The method of claim 1, further comprising determining, in response to execution of the instruction and performance of the memory access operation, a type of operation performed to access the data, an access size of the data, a timestamp corresponding to access of the data, information corresponding to a translation lookaside buffer having an accurate address contained therein, or information corresponding to the translation lookaside buffer having an inaccurate address contained therein, or any combination thereof.

7. A method, comprising:
receiving, by a host processing unit, an instruction indicative of a memory access operation, wherein the instruction includes addressing information corresponding to an emulated guest computing system and a plurality of static tracepoints;
executing the instruction to perform the memory access operation; and
transferring data corresponding to the memory access operation, virtual address information corresponding to the memory access operation, and physical address information corresponding to the memory access operation to the emulated guest computing system.

8. The method of claim 7, wherein the virtual address information corresponding to the memory access operation and the physical address information corresponding to the memory access operation are determined based, at least in part, on information corresponding to at least one static tracepoint among the plurality of static tracepoints.

9. The method of claim 7, further comprising receiving the instruction and transferring the data via an application programming interface.

10. The method of claim 7, further comprising translating, using an translation component coupled to the host processing unit and the emulated guest computing system, a virtual load/store instruction to a host load/store instruction prior to receiving the instruction indicative of the memory access operation.

11. The method of claim 7, wherein the virtual address information corresponding to the memory access operation and the physical address information corresponding to the memory access operation correspond to address locations in a memory resource resident on a computing system on which the host processing unit is deployed.

12. The method of claim 7, further comprising determining a physical address of data involved in the memory access operation, the physical address associated with the emulated guest computing system and corresponding to the memory access operation based, at least in part, on information stored in a translation lookaside buffer associated with the emulated guest computing system.

* * * * *